United States Patent [19]

Fushiya

[11] Patent Number: 5,065,082
[45] Date of Patent: Nov. 12, 1991

[54] VOLTAGE-SWITCHING MECHANISM FOR A BATTERY CHARGER FOR CHARGING BATTERIES WITH DIFFERENT VOLT RATINGS

[75] Inventor: Fusao Fushiya, Nagoya, Japan

[73] Assignee: Makita Electric Works, Ltd., Japan

[21] Appl. No.: 549,205

[22] Filed: Jul. 6, 1990

[30] Foreign Application Priority Data

Sep. 27, 1989 [JP] Japan ............................ 1-113277[U]
Apr. 27, 1990 [JP] Japan ............................ 2-45532[U]

[51] Int. Cl.$^5$ ........................................... H01H 10/46
[52] U.S. Cl. ......................................... 320/2; 320/23
[58] Field of Search .................. 320/2, 15, 16, 22, 23; 455/89

[56] References Cited

U.S. PATENT DOCUMENTS

| | | | |
|---|---|---|---|
| 4,141,616 | 2/1979 | Gottlieb | 320/2 |
| 4,214,197 | 7/1980 | Mann et al. | 320/2 |
| 4,609,861 | 9/1986 | Inaniwa et al. | 320/23 X |
| 4,873,479 | 10/1989 | Iimura et al. | 320/2 |

FOREIGN PATENT DOCUMENTS 124852  2/1957  Japan .

*Primary Examiner*—Steven L. Stephan
*Assistant Examiner*—Kristine Peckman
*Attorney, Agent, or Firm*—Lahive & Cockfield

[57] ABSTRACT

A voltage-switching mechanism for a battery charger for charging batteries with different voltage ratings includes a charging hole provided in a battery charger, having a shape similar to a shape of each of first and second batteries to be charged, and having a side opening. The voltage-switching mechanism further includes a guide groove provided in the charging hole and having a portion which forms part of the side opening, a voltage selector connected to the side opening of the charging hole and partly projecting into the guide groove, a voltage switch having an actuating element and normally connected to a second secondary terminal of a transformer with a voltage equal to the voltage rating of the second battery, a first guide portion projecting from the first battery, and a second guide portion projecting from the second battery. When the first or second battery is inserted in the guide groove, the first or second guide portion is introduced into the guide groove to ensure that the inserted battery is correctly oriented in the charging hole. The first guide portion has such a shape that, when it is introduced into the guide groove, it makes contact with the voltage selector, but the second guide portion has such a shape that, when it is introduced into the guide groove, it makes no contact with the voltage selector.

19 Claims, 10 Drawing Sheets

VOLTAGE-SWITCHING MECHANISM FOR A BATTERY CHARGER FOR CHARGING BATTERIES WITH DIFFERENT VOLT RATINGS

FIELD OF THE INVENTION

This invention relates to a battery charger and a voltage-switching mechanism for a battery charger for charging batteries with different voltage ratings.

BACKGROUND OF THE INVENTION

Japanese Utility Model Publication No. 1-24852 discloses an ampere-switching mechanism for a battery charger for charging batteries with different current ratings. This mechanism includes plural switches located below the bottom of a charging hole and push buttons projecting from the respective switches into the charging hole. Each switch is designed to meet the particular current rating of one of the batteries for which the battery charger is intended. The switching mechanism also includes recesses formed in the bottom of each rechargeable battery which accommodate the irrelevant push buttons therein, when the battery is set down into the charging hole, to keep the irrelevant switches from being actuated. Thus, when a rechargeable battery is set down into the charging hole, the battery depresses only the switch designed to meet the current rating thereof.

It is possible to exactly imitate the foregoing ampere-switching mechanism to produce a voltage-switching mechanism for a battery charger for charging batteries with different volt ratings.

However, one of the drawbacks of the foregoing ampere-switching mechanism is that it requires the use of plural switches. Another drawback is that means specially designed for not actuating the irrelevant switches, i.e., the recesses to accommodate the irrelevant push buttons, are provided in all the batteries for which the battery charger is intended. A further drawback is that since the push buttons are located at the bottom of the charging hole, the switch is not actuated if one does not fully insert the battery, i.e., if he does not insert it all the way to the bottom of the charging hole. Another drawback is that if a foreign object is in one or both of the recesses of the battery, the irrelevant push button or buttons are depressed to actuate the irrelevant switch or switches.

SUMMARY OF THE INVENTION

It is an object of the invention to provide a voltage-switching mechanism for a battery charger for charging batteries with different voltage ratings, which is free from the foregoing drawbacks of a conventional switching mechanism.

Another object of the invention is to provide such a voltage-switching mechanism wherein a portion of the battery to be charged which is provided to correctly orient the battery in a charging hole is used as a component of the switching mechanism.

Still another object of the invention is to provide such a voltage-switching mechanism which determines the voltage rating of the battery by the shape of such a portion thereof, especially its width.

A further object of the invention is to provide such a voltage-switching mechanism whereby if the battery is incorrectly inserted in a charging hole, i.e., if the battery is not resting on the bottom of the charging hole, the battery is still charged at its proper voltage rating.

Another object of the invention is to provide such a voltage-switching mechanism which does not malfunction due to foreign objects.

A further object of the invention is to provide a device for charging batteries with different voltage ratings and with projecting guide portions of different widths.

According to the invention, a voltage-switching mechanism for a battery charger for charging batteries with different voltage ratings includes a charging hole provided in a battery charger, having a shape similar to a shape of each of first and second batteries to be charged, and having a side opening. The first or second battery is set in the charging hole when the battery is to be charged. The voltage-switching mechanism further includes a guide groove provided in the charging hole and having a portion which forms part of the side opening, a voltage switch having an actuating element and normally connected to a second secondary terminal of a transformer with a voltage equal to the voltage rating of the second battery, a voltage selector connected to the side opening and partly projecting into the guide groove, a first guide portion projecting from the first battery, and a second guide portion projecting from the second battery. When the first or second battery is inserted in the charging hole, the first or second guide portion is introduced into the guide groove to ensure that the battery is correctly oriented in the charging hole. The first guide portion has such a shape that, when the first guide portion is introduced into the guide groove, the first guide portion makes contact with the voltage selector, thereby causing the voltage selector to depress the actuating element of the voltage switch to switch the charging voltage to the voltage rating of the first battery. The second guide portion has such a shape that, when the second guide portion is introduced into the guide groove, the second guide portion makes no contact with the voltage selector.

The voltage selector may be formed of an elastic material so that, when the first guide portion makes contact therewith, the voltage selector flexes to depress the actuating element of the voltage switch. Alternatively, the voltage selector may be formed of a rigid material, and may be connected to the side opening of the charging hole for pivotal motion such that, when the first guide portion makes contact with the voltage selector, the voltage selector turns by a certain angle to depress the actuating element of the voltage switch.

According to one aspect of the invention, the first guide portion may be so shaped that it substantially fills the guide groove when the first guide portion is introduced into the guide groove, and the second guide portion may be so formed as to have a smaller width than the first guide portion.

DETAILED DESCRIPTION OF A PREFERRED EMBODIMENT

A battery charger which embodies the invention in a preferred form will now be described with reference to the drawings.

Figure 1:
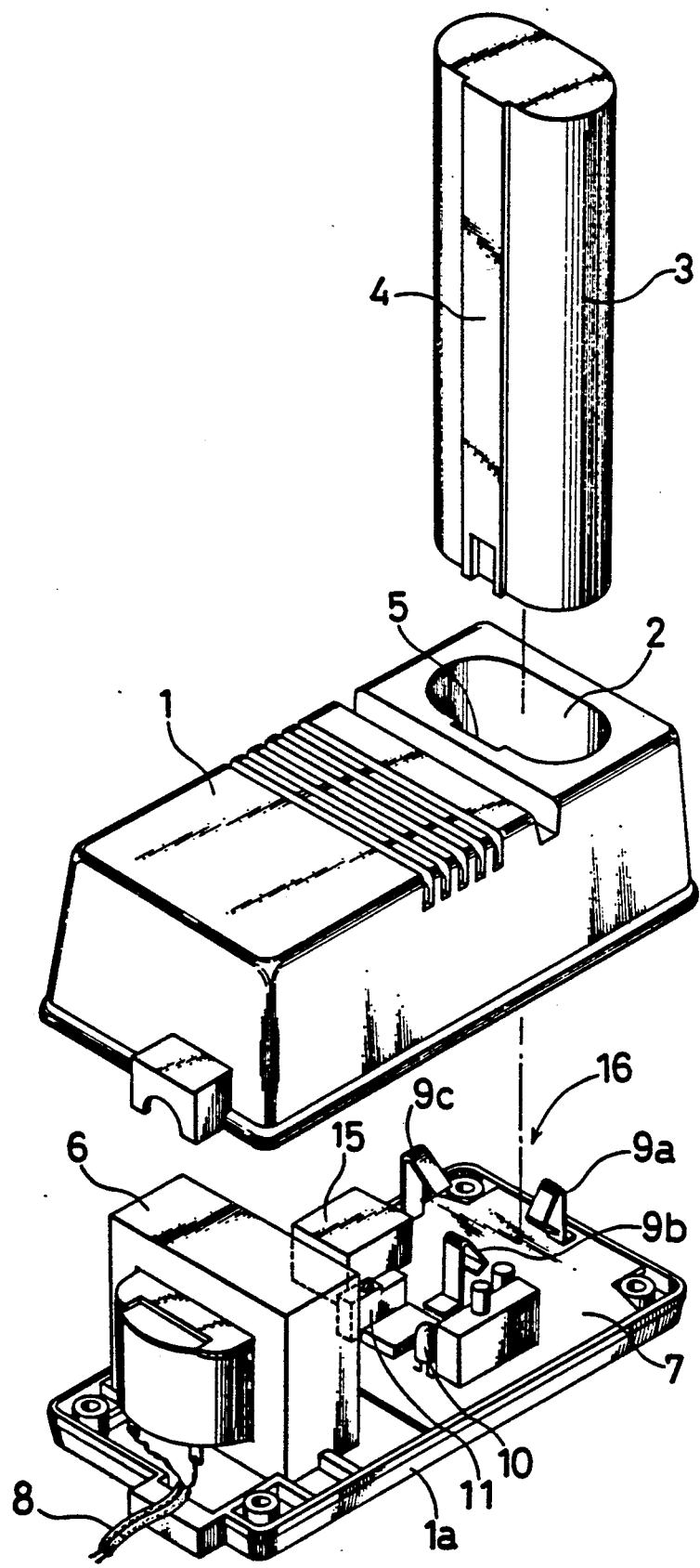
FIG. 1 is an exploded view of a battery charger of the invention.
Figure 2:
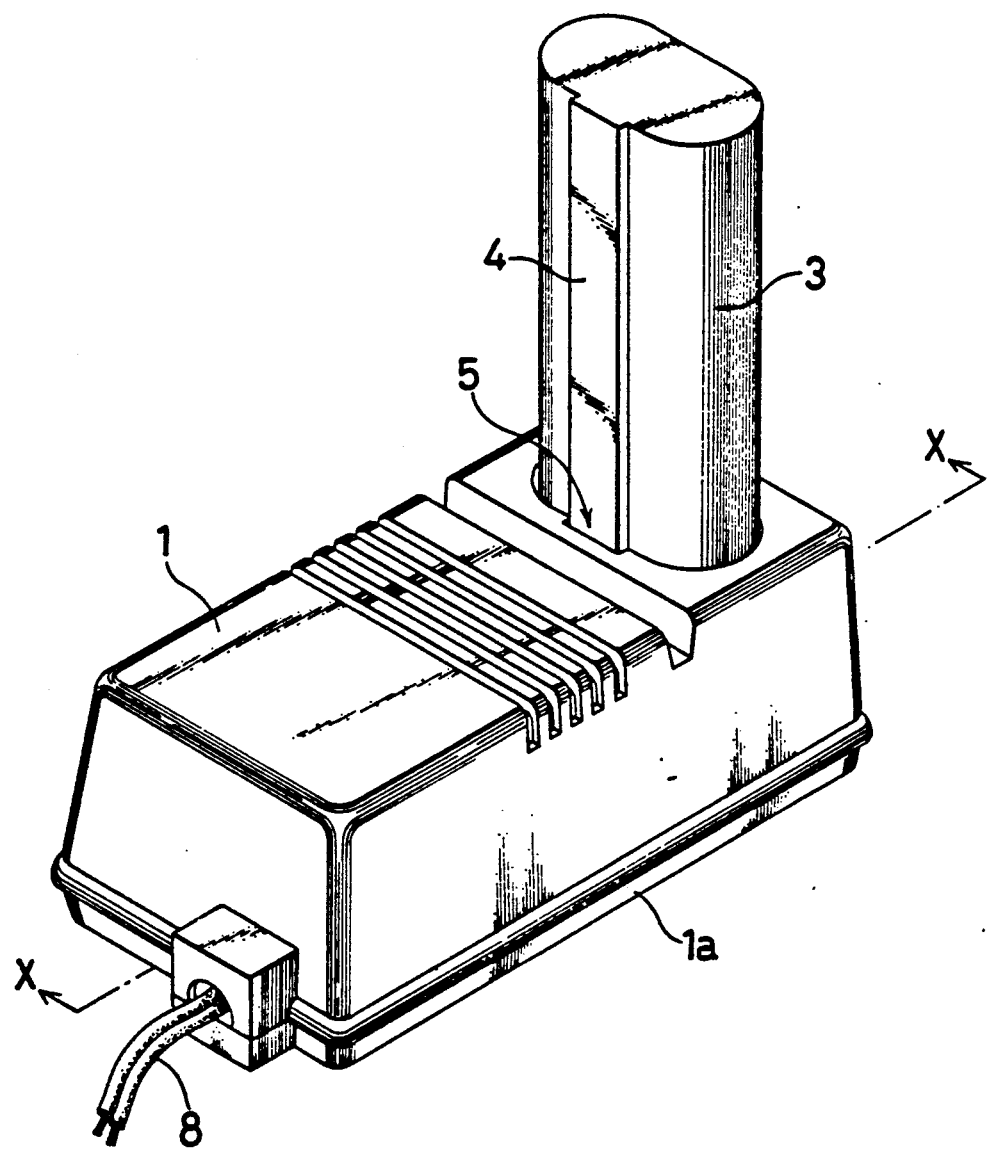
FIG. 2 shows the battery charger in which a battery to be charged is inserted.

Referring to FIG. 1 in particular, the battery charger includes a housing 1 and a body 16 encased in the housing 1. The housing 1 is formed of synthetic resin. The body 16 is constructed in accordance with a circuit diagram of FIG. 9. The housing 1 has a charging hole 2 into which to insert, or place, a secondary, or rechargeable battery 3 to be charged. As illustrated, the battery 3 may have, for example, an oval shape in its cross section. The charging hole 2 is formed into a shape similar to the shape of the battery 3. The battery 3 is provided with a guide portion 4 projecting from the side surface thereof and extending along the length thereof. As will become apparent, the guide portion 4 acts as part of a voltage-switching mechanism which causes the charger to charge the battery 3 at the voltage rating of the latter. Also, although not shown, the battery 3 has at its lower end portion (not at its bottom) a positive terminal, a negative terminal, and a terminal of a thermostat provided in the battery 3. These terminals are exposed to the outside. The charging hole 2 has a bottom wall, and has such a depth that when the battery 3, or to be more exact, a lower portion thereof is inserted into the charging hole 2 (FIG. 2), the battery 3 is firmly held in the charging hole 2. A vertical guide groove 5 is provided on one side of the wall defining the charging hole 2. The guide groove 5 is located correspondingly to the guide portion 4 of the battery 3 to receive the guide portion 4. To speak comprehensively, the charging hole 2 is shaped sufficiently like the battery 3 such that it is not possible to insert the battery 3 into the charging hole 2 without mating the projection 4 with the guide groove 5.

The body 16 includes a printed board 7 supported on a bottom plate 1a. A voltage switch 11, a light emitting diode 10, a relay 15 and three conducting plates 9a, 9b, 9c are located on the printed board 7. A transformer 6 is located on the bottom plate 1a. A power cable 8 is connected to the transformer 6.

Figure 5A:
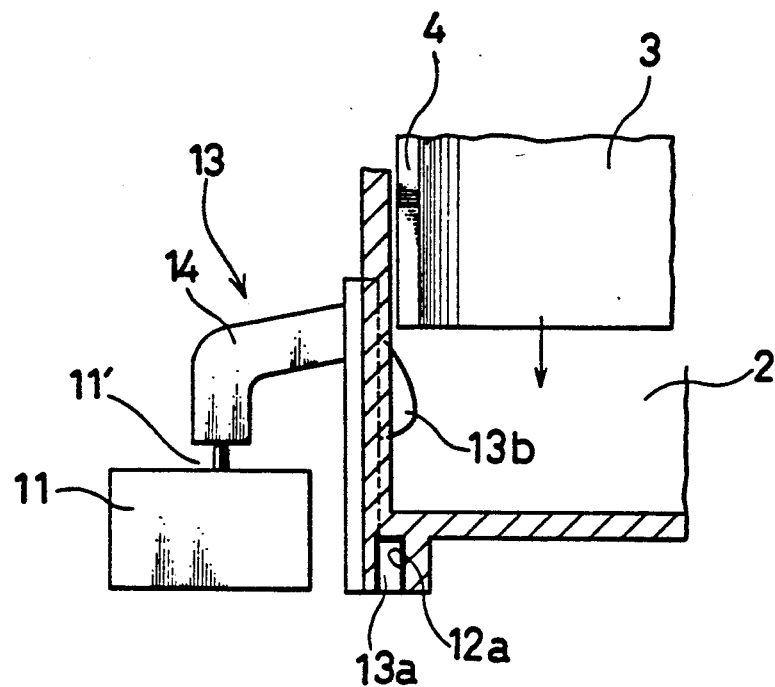
FIGS. 5(a) and, 5(b) illustrate how the voltage-switching mechanism works.
Figure 5B:
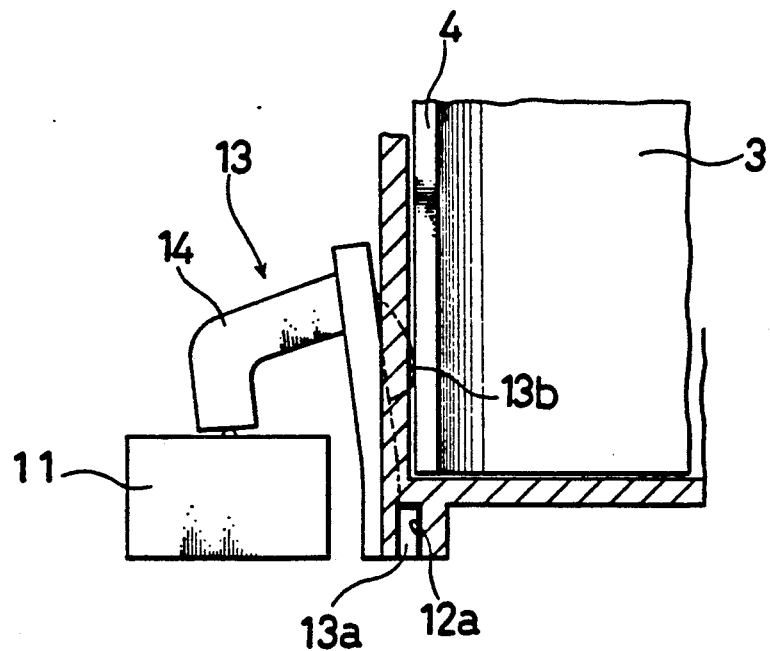

The voltage switch 11 is provided with a small actuator, or pushbutton, 11' which is movable between an upper, inactive position (FIG. 5(a)) and a lower, active position (FIG. 5(b)). The actuator 11' is normally urged to the upper position by a spring (not shown) provided in the voltage switch 11.

Figure 3:
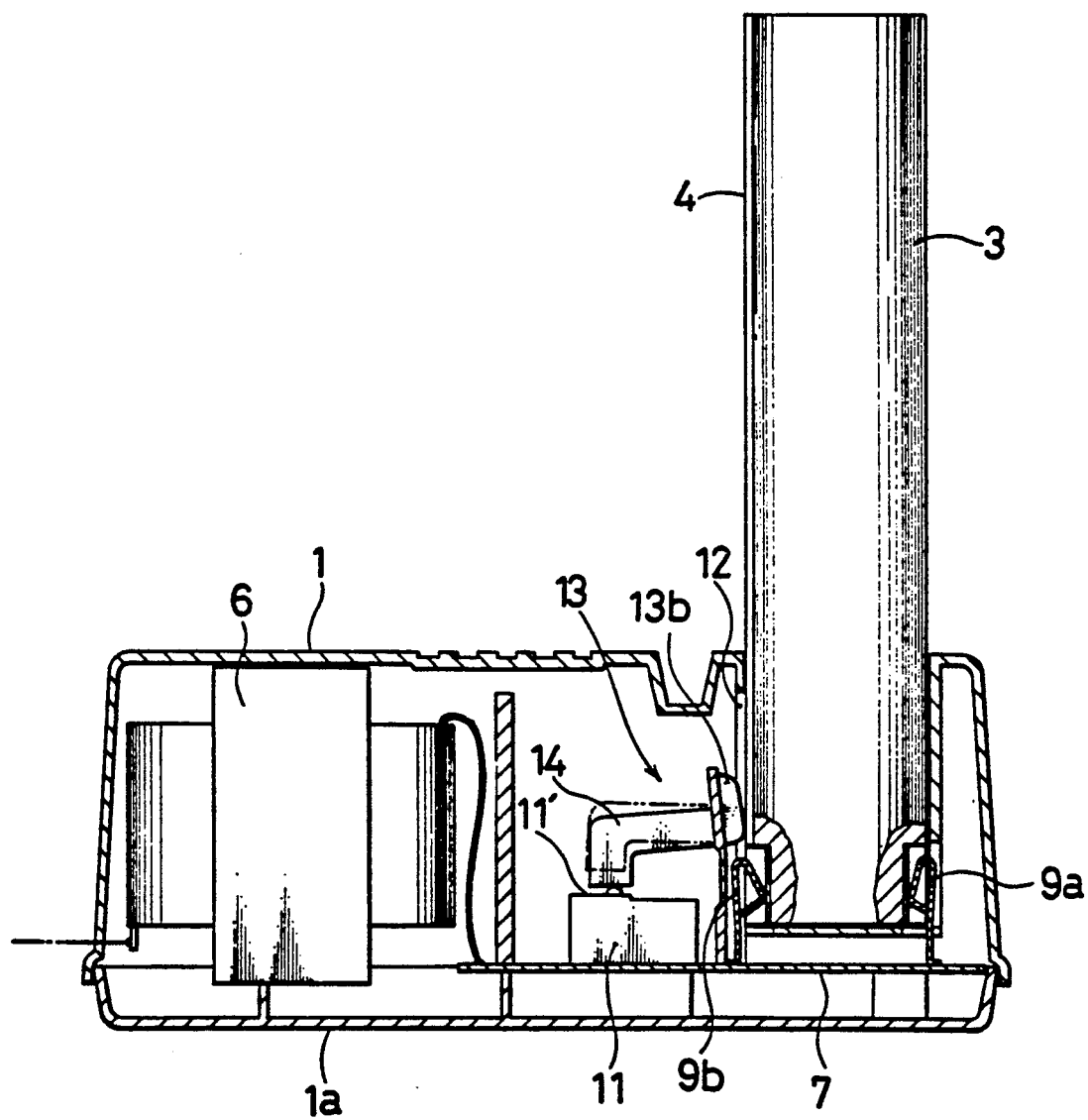
FIG. 3 is a view taken on line X—X of FIG. 2.

The bottom wall of the charging hole 2 has three openings which receive the respective conducting plates 9a, 9b and 9c, as partly shown in FIG. 3. That is, the greater parts of the conducting plates 9a, 9b and 9c project through the respective openings and are located in the charging hole 2. When the battery 3 is inserted into the charging hole 2, the positive terminal, the negative terminal and the thermostat terminal of the battery 3 come into contact with the conducting plates 9a, 9b and 9c, respectively.

Figure 4:
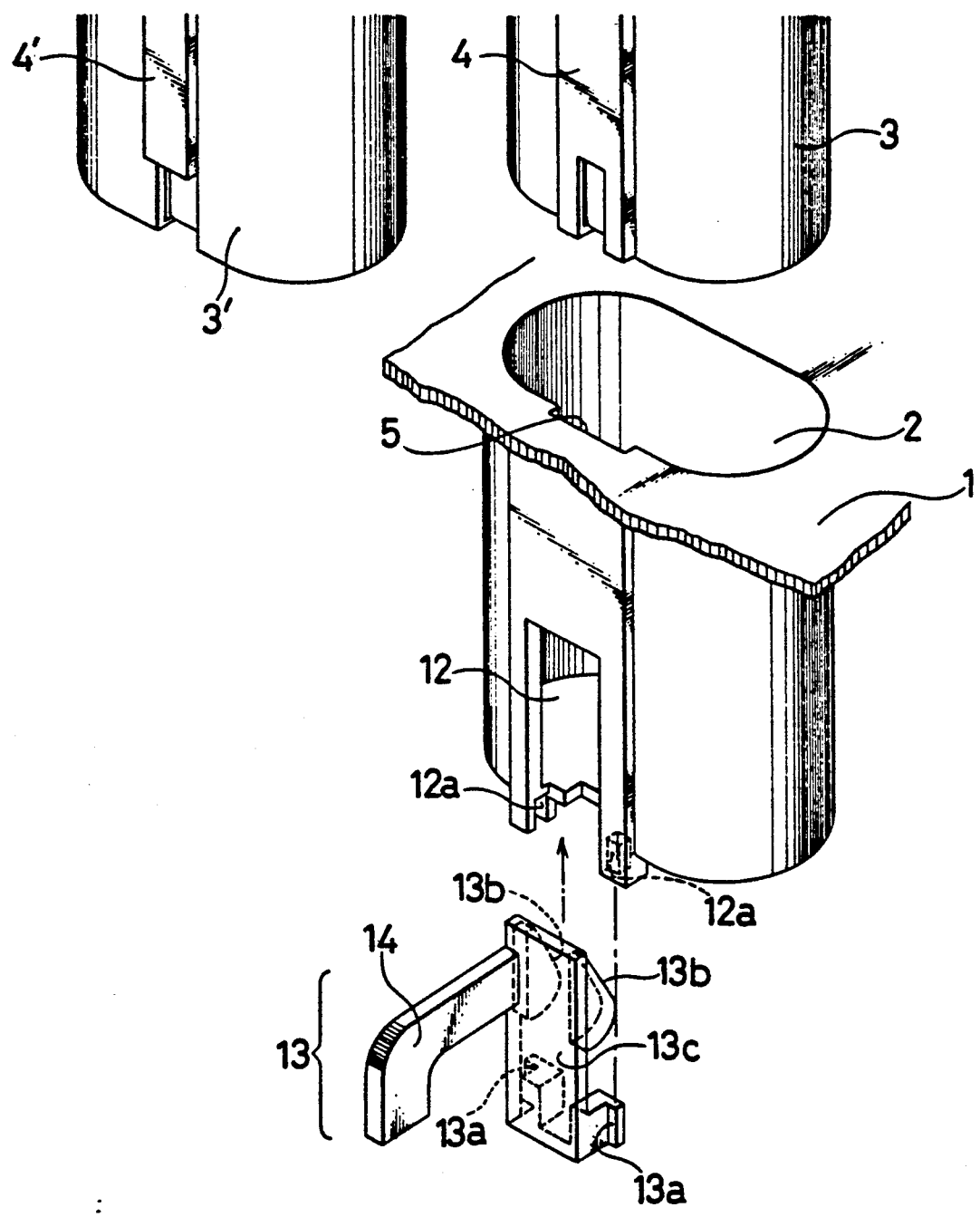
FIG. 4 depicts a major portion of a voltage-switching mechanism of the invention.

Also, as shown in FIG. 4, the guide groove 5 has an opening 12 at its lower half. A pair of opposed recesses 12a are provided in conjunction with the opening 12.

Reference numeral 13 designates a voltage selector. As best shown in FIG. 4, the voltage selector 13 includes (i) a vertical wall element 13c, (ii) a lower pair of opposed projections 13a projecting from one surface of the vertical wall element 13c, (iii) an upper pair of opposed projections 13b projecting from the same surface of the vertical wall element 13c as the lower projections 13a, and (iv) a generally L-shaped pushing element 14 projecting from the opposed surface of the vertical wall element 13c. These components of the voltage selector 13 are integrally formed of elastic material.

The lower projections 13a of the voltage selector 13 are so shaped that the lower projections 13a snugly fit in the respective recesses 12a of the housing 1 (FIGS. 5(a) and 5(b)). The greater part of each upper projection 13b of the voltage selector 13 is located in the guide groove 5 of the charging hole 2 (FIG. 5(a)) through the opening 12. The remaining portion of the voltage selector 13, including the vertical wall element 13c and the pushing element 14, is located virtually outside the wall defining the charging hole 2 (FIG. 5(a)). Thus, the greater part of the voltage selector 13 is located outside that wall. The bottoms of the lower projections 13a are supported on the printed board 7.

However, when the battery 3 is inserted into the charging hole 2, the voltage selector 13 (or to be more exact, the vertical wall element 13c thereof) is flexed by the guide portion 4 of the battery 3 (as described later) since the voltage selector 13 is of an elastic material. The voltage switch 11 is so located that when the voltage selector 13 is flexed, the actuator 11' of the voltage switch 11 is depressed by the pushing element 14 of the voltage selector 13.

As described before, when the battery 3 is inserted into the charging hole 2, the positive terminal, the negative terminal and the thermostat terminal of the battery 3 come into contact with the conducting plates 9a, 9b and 9c, respectively. When the charger and the battery 3 are thus electrically connected, the light emitting diode 10 emits light to indicate that the battery 2 is being charged.

As illustrated in FIG. 1, the guide portion 4 of the battery 3 has a recess at its lower end portion. The negative terminal (not shown) of the battery 3 is located in this recess.

The battery charger of the invention is designed to charge two different types of batteries with different voltage ratings. For the sake of discussion the battery charger hereof will hereinafter be described as being designed to charge a battery with a rating of 7.2 volts and a battery with a rating of 9.6 volts. Let it be supposed that the battery 3 illustrated in the drawing is one with a rating of 7.2 volts.

Figure 9:
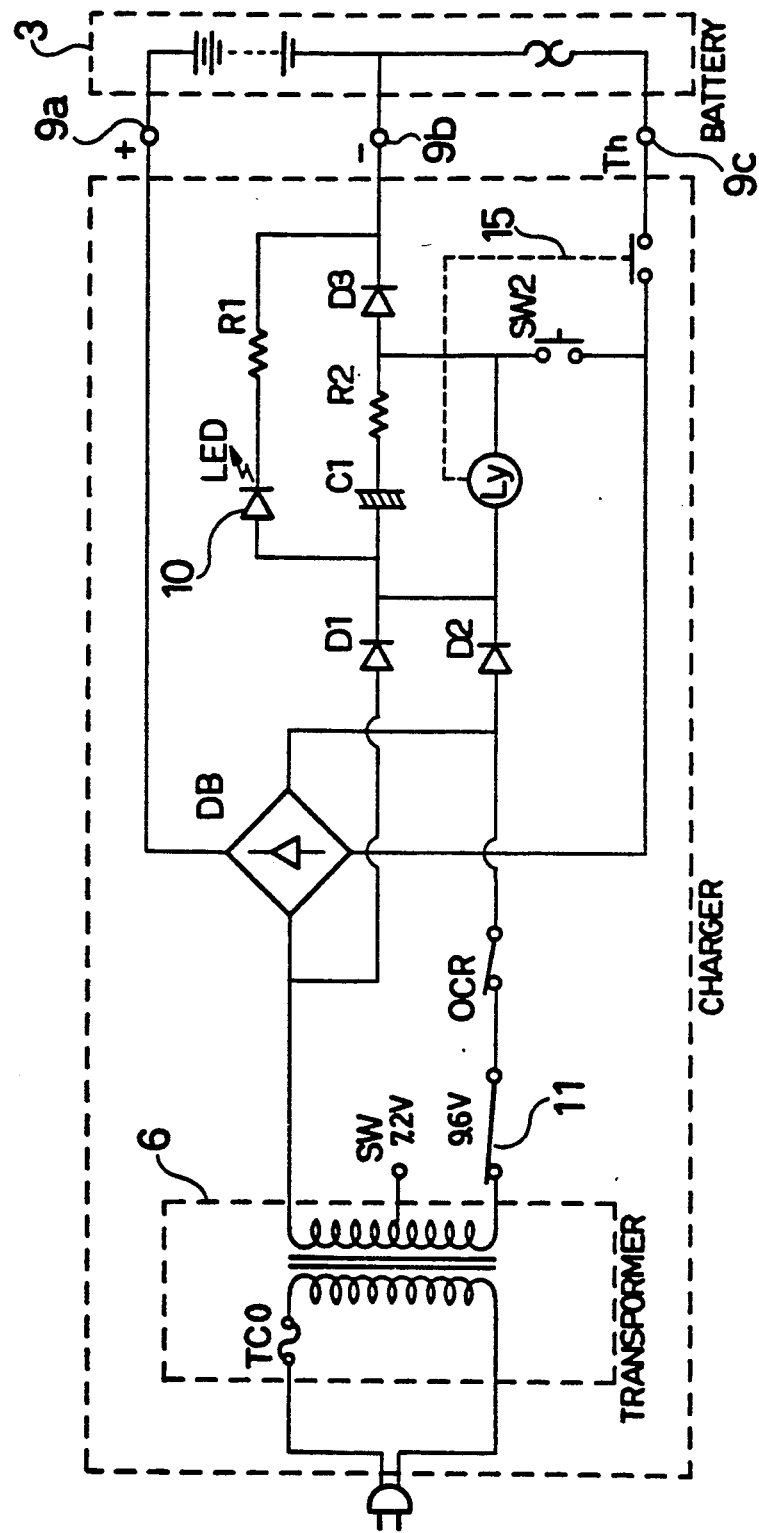
FIG. 9 shows a circuit diagram according to which the battery charger is constructed.

The transformer 6 has two secondary terminals (FIG. 9). One is a 7.2-volt secondary terminal and the other is a 9.6-volt secondary terminal. The voltage switch 11 is normally connected to the 9.6-volt secondary terminal (FIG. 9). Normally, therefore, when the charger is connected to a commercial power supply (by means of the power cable 8), a voltage of 9.6 volts is applied to the conducting plates 9a and 9b. But when the actuator 11' of the voltage switch 11 is depressed (FIG. 5(b)), the voltage switch 11 is disconnected from the 9.6-volt secondary terminal and is connected to the 7.2-volt secondary terminal. When the actuator 11' is released, the voltage switch 11 is connected to the 9.6-volt secondary terminal again.

The guide portion 4 of the battery 3 has substantially the same shape as the guide groove 5 of the charging hole 2. To be more exact, the guide portion 4 has both a sufficient width to make contact with the projections 13b of the voltage selector 13 when the guide portion 4 is inserted into the guide groove 5 and a sufficient depth to cause the voltage selector 13 to flex by making contact with the projections 13b (as shown in FIG. 5(b)). Thus, when the battery 3 is placed in the charging hole 2, the voltage selector 13 is flexed and depresses the actuator 11' of the voltage switch 11 with its pushing element 14 (FIG. 5(b)). Thus, the voltage switch 11 is connected to the 7.2-volt terminal of the transformer 6, so that a voltage of 7.2 volts is applied to the conducting plates 9a and 9b.

Thus, the battery 3 is automatically charged at its voltage rating simply by placing it in the charging hole 2.

Since the voltage selector 13 is of an elastic material, upon removal of the battery 3 from the charging hole 2 the voltage selector 13 immediately returns to its original shape (FIG. 5(a)) and, the actuator 11' simultaneously springs back to the upper position (FIG. 5(a)).

The other battery chargeable by the charger hereof (not shown), namely, a battery with a rating of 9.6 volts will be hereinafter referred to as a "second battery". The second battery is designated by reference numeral 3, in FIG. 4. The second battery 3' has the same shape and size as the 7.2-volt battery 3, except that the guide portion 4' of the second battery 3' does not have a sufficient width to make contact with the projections 13b of the voltage selector 13 when the guide portion 4' thereof is inserted into the guide groove 5 of the charging hole 2. Thus, when the second battery 3' is placed in the charging hole 2, the voltage selector 13 is not flexed and, hence, the actuator 11' of the voltage switch 11 is not depressed. Therefore, when the second battery 3' is placed in the charging hole 2, the charging voltage is not switched to 7.2 volts, but remains 9.6 volts.

Thus, the second battery 3' is also automatically charged at its voltage rating simply by placing it in the charging hole 2.

Since the function of the guide portion 4' of the second battery 3' is not to flex the voltage selector 13, the guide portion 4' thereof apparently is unnecessary. However, if the guide portion 4' is omitted from the second battery 3', the user must think in which direction to orient it to it properly. Thus, with the second battery 3', the guide portion 4' serves to indicate the correct direction in which to orient the battery. In other words, as with the 7.2-volt battery 3, it is not possible to place the second battery 3' in the charging hole 2 without mating the guide portion 4' with the guide groove 5 of the charging hole 2.

When the battery has reached a predetermined temperature, the conducting plate 9c in contact with the thermostat terminal of the battery causes the relay 15 to operate to stop the charger from charging the battery.

According to the invention, the guide portion 4 of the battery 3 not only enables the user to place the battery 3 correctly in the charging hole 2, but also cooperates with the voltage selector 13 to switch the charging voltage to the volt rating of itself.

Only one switch 11 is required to switch the charging voltage.

The element which becomes engaged by the guide portion 4, namely, the projections 13b of the voltage selector 13 are located not on the bottom of the charging hole 2, but midway in the path 5 of the guide portion 4. Thus, if the battery 3 is not fully inserted into the charging hole 2 for some reason or other, the battery 3 can still be charged at its voltage rating.

Also, if foreign objects are on the projections 13b of the voltage selector 13, the foreign objects do not cause the voltage selector 13 to malfunction since the foreign objects can be removed by the guide portion 4 when the guide portion 4 is inserted into the guide groove 5.

In addition, if the battery is inserted into the charging hole 2, the actuator 11' is not damaged since the actuator 11' is depressed not directly by the guide portion 4, but indirectly via the voltage selector 13.

The foregoing voltage selector 13 is enabled to make an actuator-depressing motion by the nature of its material, i.e., its elasticity. However, if desired, a voltage selector of a rigid material may be used instead of the elastic voltage selector 13. Such a voltage selector is illustrated in FIGS. 6, 7, 8(a) and 8(b).

Figure 6:
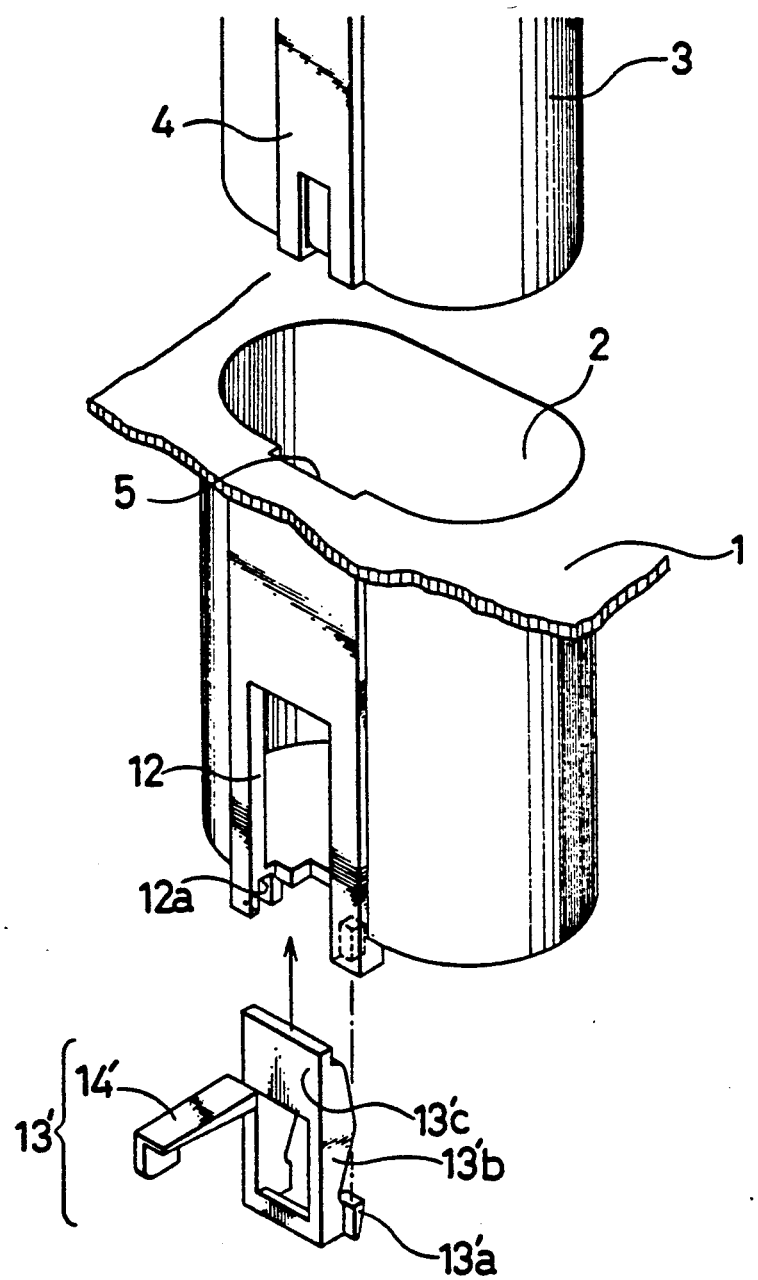
FIGS. 6, 7, 8(a) and 8(b) depict a voltage selector which is different from that used in the voltage-switching mechanism of FIGS. 4, 5(a) and 5(b)
Figure 7:
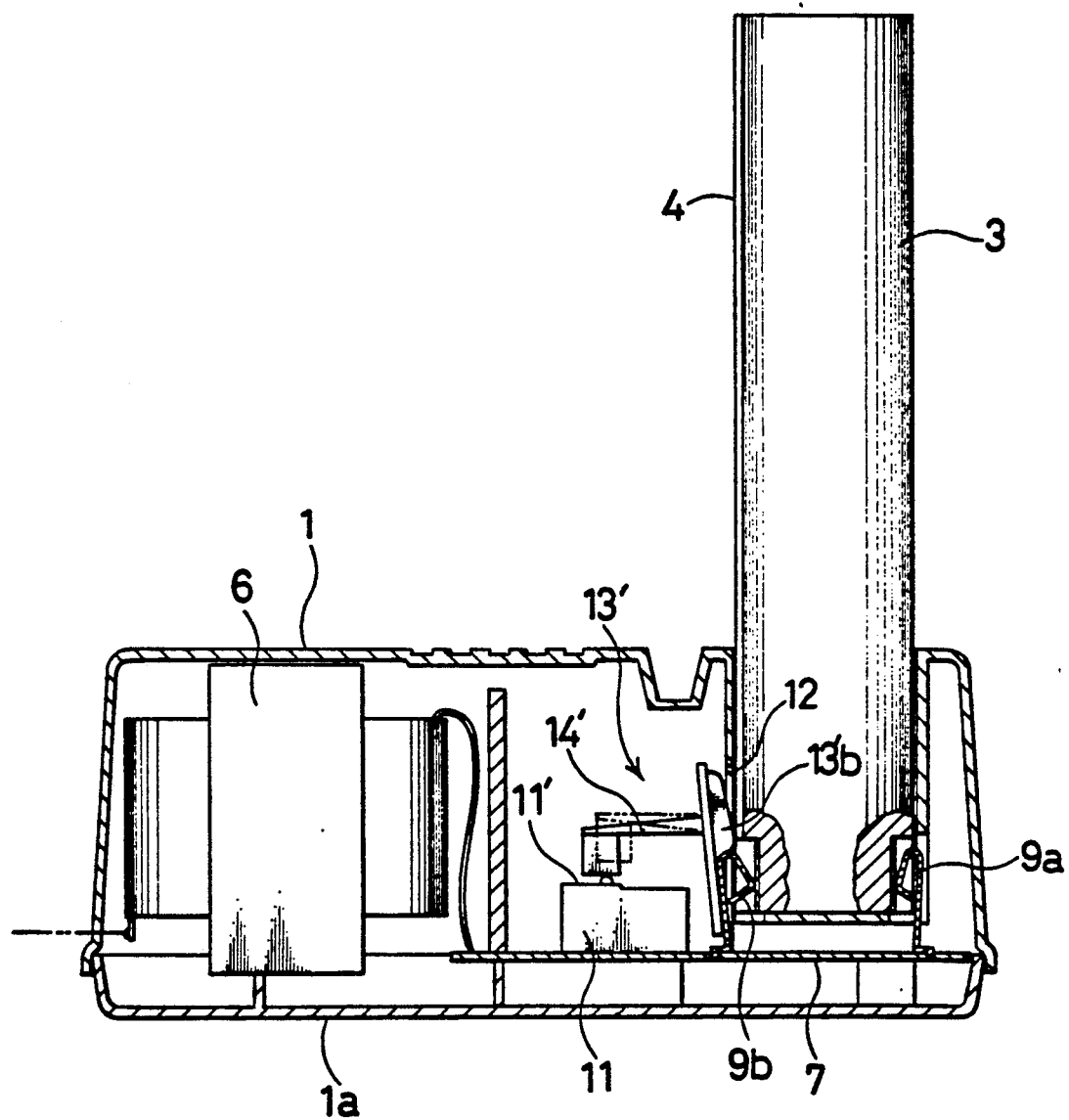
Figure 8:
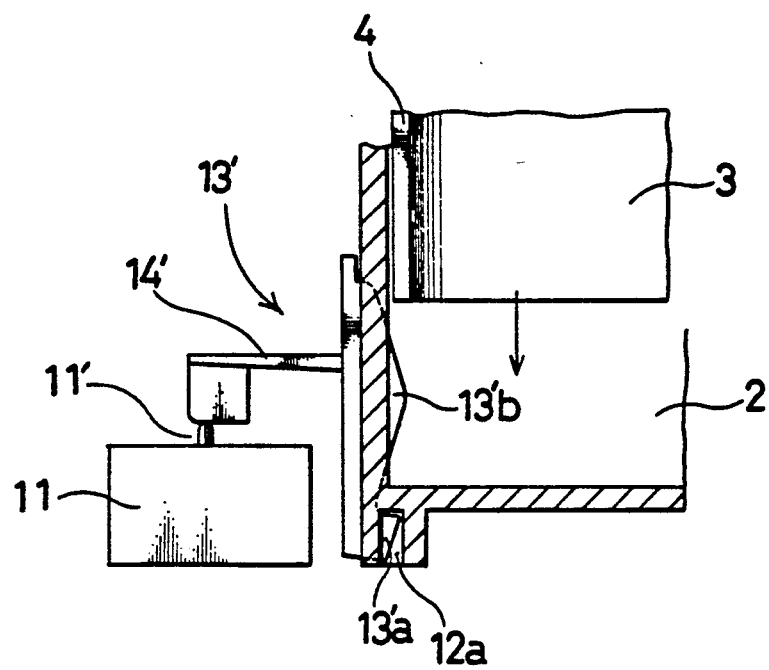
Figure 8:
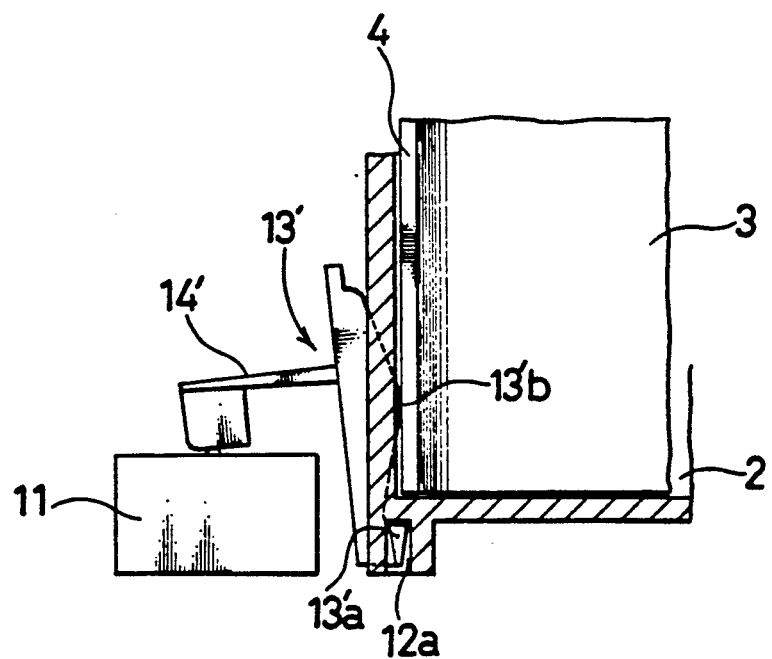

Since a voltage selector 13' of FIGS. 6, 7, 8(a) and 8(b) is formed of a rigid material, the voltage selector 13' naturally does not flex when the guide portion 4 of the battery 3 makes contact therewith. Instead, lower projections 13'a of the voltage selector 13' do not fit snugly in the respective recesses 12a of the housing 1, but are loosely positioned therein with the shape of a wedge as best shown in FIGS. 8(a) and 8(b). Also, as depicted in FIG. 8(a), the voltage selector 13' has a bottom portion which is not horizontal, but is slightly inclined from the lowest end of the selector 13' to the upper left. The lowest end of the voltage selector 13' is supported on the printed board 7. Thus, the voltage selector 13' is capable of pivotal motion about the lowest end thereof (FIGS. 7 and 8(b)).

Since the lowest end of the voltage selector 13' is supported on the printed board 7, there is no possibility that the voltage selector 13' may be removed from the opening 12 of the housing 1.

Another major difference between the voltage selectors 13 and 13' is that each of opposed projections 13'b of the voltage selector 13' corresponding to the projections 13b of the voltage selector 13 does not project from an upper portion of a vertical wall element 13'c, but becomes gradually higher from upper and lower portions of the vertical wall element 13'c and forms an apex portion at the middle of the height of the vertical wall element 13'c. A portion of each projection 13'b including the apex portion is located in the guide groove 5.

Thus, when the battery 3 is placed in the charging hole 2, the guide portion 4 of the battery 3 makes contact with the projections 13'b of the voltage selector 13' and, hence, the voltage selector 13' is turned in a counterclockwise direction to depress the actuator 11' of the switch 11 with its pushing element 14' (FIGS. 7 and 8(b)). Thus, the battery 3 is charged at its voltage rating.

When the battery 3 is removed from the charging hole 2, the actuator 11' springs back to the upper position. Hence, although of a rigid material, the voltage selector 13' is turned back to the original position.

The pushing element 14' has a different shape than the pushing element 14. This difference, however, is not an essential one.

As shown in FIG. 6, a relatively large opening may be made through the vertical wall element 13'c to make the voltage selector 13' as light as possible in its weight. The lighter the voltage selector 13' is in its weight, the more readily it is turned. It is not necessary to make a similar opening through the vertical wall element 13c of the voltage selector 13, since the voltage selector 13 performs its function by its elasticity.

Figure 10:
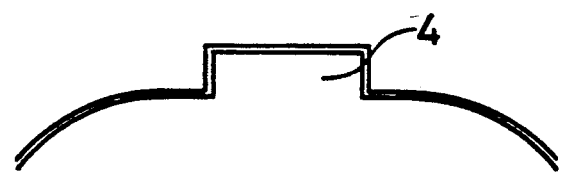
FIGS. 10(a)-10(d) shows variations of a guide portion.
Figure 10:
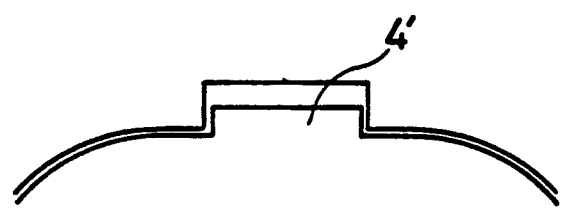
Figure 10:
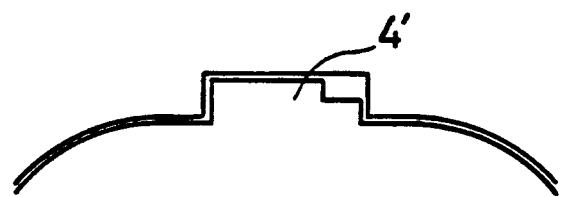
Figure 10:
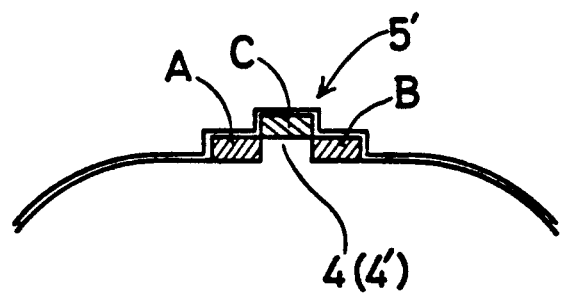

It will be appreciated that the guide portion 4 of the 7.2-volt battery 3 has a horizontal cross section of FIG. 10(a). Although not shown in FIG. 10, the guide portion 4' of the 9.6-volt battery 3' has the same depth as the guide portion 4, but has a smaller width than the guide portion 4. If desired, however, the guide portion 4' may be formed as shown in FIG. 10(b). That is, the guide portion 4' may be so formed as to have the same width as the guide portion 4, but have a smaller depth than the guide portion 4. Where the guide portion 4' is formed into such a shape, the guide portion 4' does not make contact with the voltage selector 13 (or 13') if the voltage selector is so formed as not to project fully into the guide groove 5. Also, if desired, the guide portion 4' may be formed as shown in FIG. 10(c). That is, the guide portion 4' may be so formed as to have the same width as the guide portion 4, but have a portion which is less deep than the other portion. Where the guide portion 4' is formed into such a shape, the guide portion 4' does not make contact with the voltage selector if the voltage selector is modified to project into the space which is formed by the less deep portion. Also, such a variation as shown in FIG. 10(d) is possible. That is, a guide groove 5' with a central, deeper space and with side spaces which are less deep than the central space may be provided instead of the guide groove 5, and, for example, the voltage selector may be modified to project by half the central space of the guide groove 5'. And the guide portion 4 may be modified to fill all the spaces of the guide groove 5' substantially completely, i.e., to include portions A, B and C, while the guide portion 4' may be modified to fill only the half of the central space into which the voltage selector does not project and the side spaces, i.e., to include portions A and B.

What is claimed is:

1. A voltage-switching mechanism for a battery charger for charging batteries with different voltage ratings, which comprises
   (a) a charging hole provided in a battery charger, having a shape similar to a shape of each of first and second batteries to be charged, and having a side opening,
   each battery being inserted into the charging hole when it is to be charged, the battery charger normally providing a charging voltage at a voltage rating of the second battery,
   (b) a guide groove provided in the charging hole and having a portion which forms part of the side opening,
   (c) a voltage selector connected to the side opening and partly projecting into the guide groove,
   (d) a first guide portion projecting from the first battery and being introduced into the guide groove, when the first battery is inserted in the charging hole, to ensure that the first battery is correctly oriented in the charging hole,
   the first guide portion having such a shape that, when the first guide portion is introduced into the guide groove, the first guide portion makes contact with the voltage selector, thereby causing the voltage selector to depress an actuating element of a voltage switch to switch said charging voltage to a voltage rating of the first battery, and
   (e) a second guide portion projecting from the second battery and being introduced into the guide groove, when the second battery is inserted in the charging hole, to ensure that the second battery is correctly oriented in the charging hole,
   the second guide portion having such a shape that, when the second guide portion is introduced into the guide groove, the second guide portion makes no contact with the voltage selector.

2. A voltage-switching mechanism in accordance with claim 1 wherein the voltage selector is formed of an elastic material and, hence, when the first guide portion makes contact therewith, the voltage selector flexes to depress the actuating element of the voltage switch.

3. A voltage-switching mechanism in accordance with claim 1 wherein the voltage selector is formed of a rigid material, and is connected to the side opening of the charging hole for pivotal motion such that, when the first guide portion makes contact with the voltage selector, the voltage selector turns by a certain angle to depress the actuating element of the voltage switch.

4. A voltage-switching mechanism in accordance with claim 1 wherein the first guide portion has such a shape that it substantially fills the guide groove when the first guide portion is introduced into the guide groove, while the second guide portion has a smaller width than the first guide portion.

5. A voltage-switching mechanism in accordance with claim 2 wherein the first guide portion has such a shape that it substantially fills the guide groove when the first guide portion is introduced into the guide groove, while the second guide portion has a smaller width than the first guide portion.

6. A voltage-switching mechanism in accordance with claim 3 wherein the first guide portion has such a shape that it substantially fills the guide groove when the first guide portion is introduced into the guide groove, while the second guide portion has a smaller width than the first guide portion.

7. A device for charging batteries with different voltage ratings and with projecting guide portions of different widths, which comprises
   (a) a charging hole in which to insert a battery to be charged,
   the charging hole being formed into a shape similar to a shape of each of first and second batteries to be charged and having a side opening,
   (b) a guide groove provided in the charging hole for receiving the guide portion of a battery, when the battery is inserted in the charging hole, to ensure that the battery is correctly oriented in the charging hole,
   the guide groove having a portion which forms part of the side opening,
   (c) a transformer having a first secondary terminal with a voltage equal to the voltage rating of the first battery and a second secondary terminal with a voltage equal to a voltage rating of the second battery,
   (d) a voltage switch having an actuating element and normally connected to the second secondary terminal of the transformer, and (e) selector means connected to the side opening of the charging hole and partly projecting into the guide groove to be engaged by the guide portion of the first battery, the selector means depressing the actuating element of the voltage switch when the selector means is engaged by the guide portion of the first battery, thereby disconnecting the voltage switch from the second secondary terminal of the transformer and instead connecting the voltage switch to the first secondary terminal thereof to switch a charging voltage to the voltage rating of the first battery.

8. A device in accordance with claim 7 wherein the selector means is formed in an elastic material and, hence, when the selector means is engaged by the guide portion of the first battery, the selector means flexes to depress the actuating element of the voltage switch.

9. A device in accordance with claim 7 wherein the selector means is formed of a rigid material, and is connected to the side opening of the charging hole for pivotal motion such that, when the selector means is engaged for the guide portion of the first battery, the selector means turns by a certain angle to depress the actuating element of the voltage switch.

10. A device for charging batteries with different voltage ratings and with projecting guide portions of different widths, which comprises (a) a charging hole in which to insert a battery to be charged, the charging hole being formed into a shape similar to a shape of each of first and second batteries to be charged and having a side opening, (b) a guide groove provided in the charging hole for receiving the guide portion of a battery, when the battery is inserted in the charging hole, to ensure that the battery is correctly oriented in the charging hole, the guide groove having a portion which forms part of the side opening, (c) a transformer having a first secondary terminal with a voltage equal to the voltage rating of the first battery and a second secondary terminal with a voltage equal to a voltage rating of the second battery, (d) a voltage switch having a push button and normally connected to the second secondary terminal, and (e) selector means connected to the said opening of the charging hole and being actuated, when the first battery is inserted in the charging hole, to depress the push button of the voltage switch, thereby disconnecting the voltage switch from the second secondary terminal of the transformer and instead connecting the voltage switch to the first secondary terminal thereof to switch a charging voltage to the voltage rating of the first battery.

11. A device in accordance with claim 10 wherein part of the selector means is located in the guide groove, and is engaged by the guide portion of the first battery when the first battery is inserted in the charging hole.

12. A device in accordance with claim 11 wherein the selector means is formed of an elastic material and, hence, when the selector means is engaged by the guide portion of the first battery, the selector means flexes to depress the push button of the voltage switch.

13. A device in accordance with claim 11 wherein the selector means is formed of a rigid material, and is connected to the side opening of the charging hole for pivotal motion such that, when the selector means is engaged by the guide portion of the first battery, the selector means turns by a certain angle to depress the push button of the voltage switch.

14. A voltage-switching mechanism for a battery charger for charging batteries with different voltage ratings, which comprises (a) a charging hole provided in a battery charger, having a shape similar to a shape of each of first and second batteries to be charged, and having a side opening, each battery being inserted in the charging hole when it is to be charged, (b) a guide groove provided in the charging hole and having a portion which forms part of the side opening, (c) a voltage selector connected to the side opening of the charging hole and partly projecting into the guide groove, (d) a voltage switch having an actuating element and normally connected to a second secondary terminal of a transformer with a voltage equal to the voltage rating of the second battery, (e) a first guide portion projecting from the first battery and being introduced into the guide groove, when the first battery is inserted in the charging hole, to ensure that the first battery is correctly oriented in the charging hole, the first guide portion having such a shape that, when the first guide portion is introduced into the guide groove, the first guide portion makes contact with the voltage selector, thereby causing the voltage selector to depress the actuating element of the voltage switch to disconnect the voltage switch from the second secondary terminal of the transformer and instead connect the voltage switch to a first secondary terminal thereof with a voltage equal to the voltage rating of the first battery, and (f) a second guide portion projecting from the second battery and being introduced into the guide groove, when the second battery is inserted in the charging hole, to ensure that the second battery is correctly oriented in the charging hole, the second guide portion having such a shape that, when the second guide portion is introduced into the guide groove, the second guide portion makes no contact with the voltage selector.

15. A voltage-switching mechanism in accordance with claim 14 wherein the voltage selector is formed of an elastic material and, hence, when the first guide portion makes contact therewith, the voltage selector flexes to depress the actuating element of the voltage switch.

16. A voltage-switching mechanism in accordance with claim 14 wherein the voltage selector is formed of a rigid material, and is connected to the side opening of the charging hole for pivotal motion such that, when the first guide portion makes contact with the voltage selector, the voltage selector turns by a certain angle to depress the actuating element of the voltage switch.

17. A voltage-switching mechanism in accordance with claim 14 wherein the first guide portion has such a shape that it substantially fills the guide groove when the first guide portion is introduced into the guide groove, while the second guide portion has a smaller width than the first guide portion.

18. A voltage-switching mechanism in accordance with claim 15 wherein the first guide portion has such a shape that it substantially fills the guide groove when the first guide portion is introduced into the guide groove, while the second guide portion has a smaller width than the first guide portion.

19. A voltage-switching mechanism in accordance with claim 16 wherein the first guide portion has such a shape that it substantially fills the guide groove when the first guide portion is introduced into the guide groove, while the second guide portion has a smaller width than the first guide portion.

* * * * *

UNITED STATES PATENT AND TRADEMARK OFFICE
CERTIFICATE OF CORRECTION

PATENT NO. : 5,065,082
DATED : November 12, 1991
INVENTOR(S) : Fushiya et al.

It is certified that error appears in the above-identified patent and that said Letters Patent is hereby corrected as shown below:

On the title page, Item [75]
Inventors, after "Fusao Fushiya, Nagoya, Japan" please correct the omission of two co-inventors by inserting:

-- Yasumasa Mizuno, Okazaki, Japan
Yoshio Yokoyama, Nagoya, Japan --.

In claim 8, column 9, line 14 please delete "in" and insert -- of --.

In claim 9, column 9, line 22 please delete "for" and insert -- by --.

Signed and Sealed this

Thirtieth Day of March, 1993

*Attest:*

STEPHEN G. KUNIN

*Attesting Officer*   Acting Commissioner of Patents and Trademarks